US010609519B1

(12) United States Patent
Chaskar et al.

(10) Patent No.: US 10,609,519 B1
(45) Date of Patent: Mar. 31, 2020

(54) LOCATION TRACKING CONFIGURATION USING USER DEVICES

(71) Applicant: Arista Networks, Inc., Santa Clara, CA (US)

(72) Inventors: Hemant Chaskar, San Jose, CA (US); Venkata Ramchandra Murthy Jonnalagadda, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/430,314

(22) Filed: Jun. 3, 2019

(51) Int. Cl.
*H04W 4/029* (2018.01)
*H04W 24/10* (2009.01)
*H04W 4/02* (2018.01)
*G01S 11/06* (2006.01)
*H04W 64/00* (2009.01)
*H04W 8/26* (2009.01)
*H04W 24/08* (2009.01)

(52) U.S. Cl.
CPC ............. *H04W 4/029* (2018.02); *G01S 11/06* (2013.01); *H04W 4/025* (2013.01); *H04W 8/26* (2013.01); *H04W 24/08* (2013.01); *H04W 24/10* (2013.01); *H04W 64/003* (2013.01)

(58) Field of Classification Search
None
See application file for complete search history.

(56) References Cited

U.S. PATENT DOCUMENTS

| 7,406,320 | B1 | 7/2008 | Kumar et al. | |
|---|---|---|---|---|
| 10,387,896 | B1* | 8/2019 | Hershey | G06K 9/00771 |
| 2011/0039580 | A1* | 2/2011 | Wigren | G01S 5/0252 455/456.1 |
| 2013/0018826 | A1* | 1/2013 | Sundararajan | H04L 12/6418 706/12 |
| 2013/0324165 | A1* | 12/2013 | Fujiwara | H04W 12/06 455/457 |
| 2014/0011518 | A1* | 1/2014 | Valaee | H04W 64/00 455/456.1 |
| 2014/0044005 | A1* | 2/2014 | Keys | H04W 16/225 370/254 |
| 2014/0278060 | A1* | 9/2014 | Kordari | G01C 21/206 701/422 |

(Continued)

OTHER PUBLICATIONS

Real Time Location Services for Asset Tracking; https://developer.cisco.com/meraki/build/rtlsi; May 31, 2019; 4 pages.

(Continued)

*Primary Examiner* — German Viana Di Prisco
(74) *Attorney, Agent, or Firm* — Fountainhead Law Group P.C.

(57) ABSTRACT

In some embodiments, a method assigns an assigned user location to a device identifier of a device of a user and receives a time series of measurements of a signal associated with the device identifier. Each measurement is between the device and a set of spatially disposed radio monitors. The method filters one or more measurements from the time series of measurements based on a characteristic to generate a set of measurements. The set of measurements is associated with the assigned user location. Different sets of measurements are associated with different assigned user locations for use in location tracking of a subject client.

20 Claims, 12 Drawing Sheets

(56) References Cited

U.S. PATENT DOCUMENTS

| | | | | |
|---|---|---|---|---|
| 2015/0172854 A1* | 6/2015 | Stogaitis | ............ | H04W 64/003 |
| | | | | 370/328 |
| 2016/0171451 A1* | 6/2016 | Pugh | ................. | G06Q 10/1093 |
| | | | | 705/7.18 |
| 2016/0316342 A1* | 10/2016 | Narasimhan | ......... | H04B 17/318 |
| 2016/0337811 A1* | 11/2016 | Astrom | ................ | G01S 5/0242 |
| 2017/0024683 A1* | 1/2017 | Bares | ............ | G06Q 10/063116 |
| 2017/0272181 A1* | 9/2017 | Gudi | .................... | G01S 5/0252 |
| 2018/0120410 A1* | 5/2018 | Ivanov | ................. | G01S 5/0252 |
| 2018/0255430 A1* | 9/2018 | Ivanov | ................. | G01S 5/0252 |
| 2018/0279251 A1* | 9/2018 | Wigren | ................ | H04W 24/10 |
| 2019/0041488 A1* | 2/2019 | Ivanov | ................... | H04W 4/33 |
| 2019/0101632 A1* | 4/2019 | Ebido | ...................... | G01S 5/00 |

OTHER PUBLICATIONS

Aruba and Ekahau Joint Design and Implementation; Revision 1.0; Aruba Networks; Jan. 22, 2009; 46 pages.
Benefits of BLE Panel Discussion: https://www.youtube.com/watch?v=JhfmpifkA7g&feature=youtu.be; Nov. 29, 2018.
Stanley Healthcare Data Sheet: AeroScout Location Engine; Oct. 10, 2016; 2 pages.

\* cited by examiner

|       | RM #1 106-1 | RM #2 106-2 | RM #3 106-3 | RM #4 106-4 | RM #5 106-5 |
|-------|-------------|-------------|-------------|-------------|-------------|
| TS #1 | -45 | -50 | -60 | | |
| TS #2 | -46 | -53 | -63 | | |
| TS #3 | -43 | -48 | -55 | | |
| TS #4 |     |     | -100 | -50 | -60 |
| TS #5 | -45 | -50 | -60 | | |
| TS #6 |     |     | -60 | -60 | -70 |
| TS #7 |     | -45 | -60 | -70 | |
| TS #8 | -46 | -53 | -60 | | |

LOCATION TRACKING CONFIGURATION USING USER DEVICES

BACKGROUND

Location tracking can be used to track a location of devices. For example, a company may track the location of devices that users of the company are using within the company's worksite on an ongoing basis.

One method of location tracking uses Received Signal Strength Indicator (RSSI) pattern matching techniques. RSSI may be a measurement of signal strength (e.g., power) in a received radio signal. Within the site, RSSI may be measured for a signal between radio monitors, such as access points, and a user device. Using the RSSI measurements, a system may determine a probable location for the user device. For example, the system may have a database of reference RSSI measurements for different locations within the site. Based on the received RSSI measurements, the system can match those measurements to one of the locations within the database that includes similar reference RSSI measurements.

To build the database of measurements at different locations in the site, a site survey is required to determine the measurements. The site survey is a manual step where a surveyor walks around the site with a test device to make RSSI measurements at the different locations. For example, a surveyor may walk to a first location and make RSSI measurements on the test device for that location. Those measurements may be stored as reference RSSI measurements for that location. Then, the surveyor walks to a second location and makes additional RSSI measurements for the second location, which serve as reference RSSI measurements for the second location. This may require a large number of manual measurements. For example, if measurements are to be taken for every ten feet by ten feet in a location, a 50,000 square foot floor requires 500 measurement points. Manually taking these measurements may take a large amount of time.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
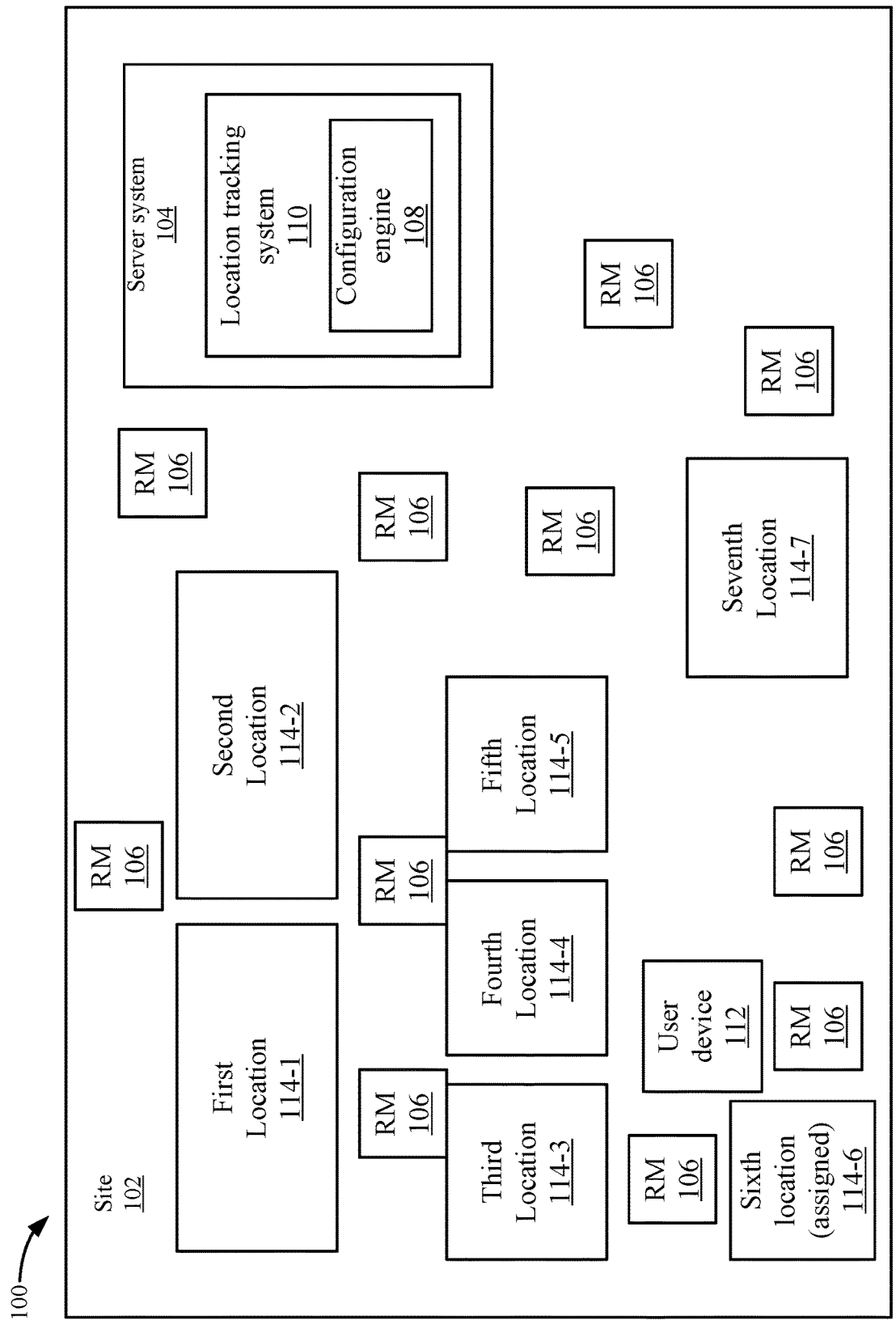
FIG. 1 depicts a simplified system for location tracking according to some embodiments.

Described herein are techniques for a location tracking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A location tracking system may use measurements, such as Received Signal Strength Indicator (RSSI) measurements, to track locations of devices. The location tracking system reduces the overhead of a manual site survey when initializing and configuring the location tracking system. For example, the location tracking system leverages the concept that users in an office environment may spend large portions of their time at assigned locations, such as cubicle locations or offices, to determine measurements that are used as references for the assigned locations.

The system may assign an assigned user location to a device identifier of a device being used by a user. For example, a user may be using a smartphone or laptop and also be assigned an office location in a work site (e.g., a building or other work location). Then, the location tracking system receives a time series of measurements of a signal between the device associated with the device identifier and a set of spatially-disposed radio monitors, such as access points. The measurements may measure a signal strength between the device and the set of spatially-disposed radio monitors.

A time series of measurements may be measured over time, such as throughout a day over multiple days, weeks, etc. The measurements may be made every second, every minute, every hour, etc. The user may be mobile and bring the device to different locations in the site. Thus, while the user is located at the assigned user location, the location tracking system receives measurements from a first set of radio monitors (or the user device) that measure a signal strength of a signal between the first set of radio monitors and the user device. Additionally, the location tracking system may receive measurements while the user is at other locations from different radio monitors that detect the signal from the device. For example, the user may move to another office location, such as a cubicle that is not assigned to the user, the cafeteria, a meeting room, etc. These locations, however, may not be proximate to or near the assigned user location.

A goal of the initialization of the location tracking system is to determine a set of measurements that will be associated with the assigned user location. Accordingly, the location tracking system may filter some of the measurements in the time series of measurements due to the user moving to other locations that are different from the assigned user location. In some examples, the location tracking system may filter one or more measurements from the time series of measurements based on a characteristic to generate a set of measurements that are used as a reference for the assigned user location. For example, different processes may be used, such as clustering processes, to determine which measurements in the time series of measurements are closely related, such as measurements that were most likely taken while the user was at or around the assigned user location.

Once the set of measurements is determined, the location tracking system associates the set of measurements with the assigned user location. The set of measurements may be used as the reference measurement when performing location tracking of devices. The above process may be performed for multiple assigned user locations with multiple devices to generate different sets of measurements for different assigned user locations, which provides a signal strength map for the site that is used to perform location tracking.

System Overview

FIG. 1 depicts a simplified system 100 for location tracking according to some embodiments. The location tracking may be performed at a site 102, which may be defined by spatial coordinates. For example, site 102 may be a work location, which may include one or more office buildings. Also, site 102 may be a contiguous location or may be separate locations (e.g., different office buildings) that are separated by space in which location tracking is not performed.

A server system 104 includes a location tracking system 110 that tracks the location of users. Location tracking system 110 also includes a configuration engine 108 that may perform the initialization and configuration of location tracking system 110. The configuration of location tracking system 110 and the location tracking will be described in more detail below.

Site 102 includes radio monitors (RMs) 106 that are spatially disposed in site 102. That is, radio monitors 106 may be located in different areas of site 102. Radio monitors 106 include radio receivers to receive a signal transmitted by other devices, such as user device 112. Additionally, radio monitors 106 may provide access to a computer network and may also include radio transmitters. That is, a company may provide access to a local area network (LAN), wide area network (WAN), or other network via radio monitors 106. A user may use a user device 112 that may include a radio transceiver. User device 112 may communicate with radio monitors 106 or other devices containing radio transceivers. User device 112 may advertise its presence by transmitting radio signals. For example, user device 112 may be a smartphone, a laptop, or other device that can connect to radio monitors 106.

Site 102 may have locations that are assigned to users based on a site map. For example, site 102 may include first location 114-1, second location 114-2, . . . , and seventh location 114-7, but sites may have different numbers of locations. In some embodiments, some of these locations may be assigned user locations where users are assigned to work, such as cubicle locations, offices, etc. Locations 114 may also be other locations in site 102, such as cafeterias, meeting rooms, etc., which may not be assigned to specific users.

Typically, a user may be assigned to one of the locations 114. The assigned user locations may be fixed such that the location for a user is not changed until the user is assigned another user location. Typically, if a user is assigned a user location (e.g., a cubicle), that user may use that user location during work hours for a majority of the time. For example, sixth location 114-6 may be assigned to a user as that user's work location. User device 112 may also be mobile in that the user can move user device 112 to different locations within site 102. Configuration engine 108 uses the concept of the user using user device 112 while mainly being at the assigned user location to configure location tracking system 110, which will be described in more detail.

Location Tracking System Configuration

Figure 2:
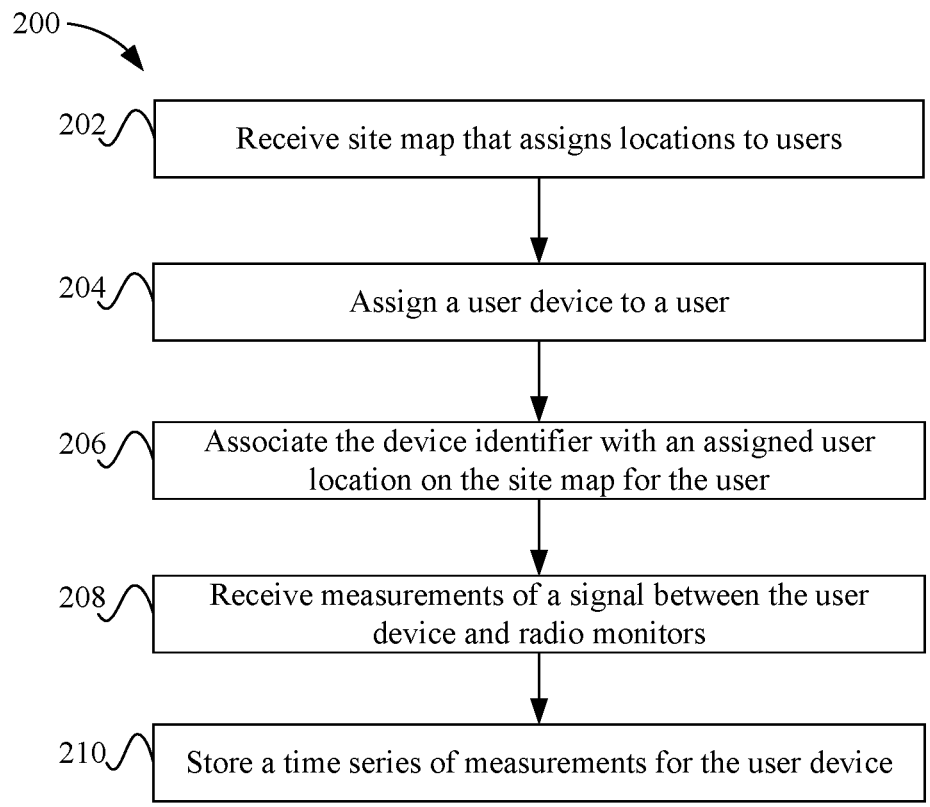
FIG. 2 depicts a simplified flowchart of a method for configuring a location tracking system according to some embodiments.

FIG. 2 depicts a simplified flowchart 200 of a method for configuring location tracking system 110 according to some embodiments. At 202, configuration engine 108 receives a site map that assign locations 114 to users. The site map may define locations, such as the site map may be a floor map for a work site. The site map may be determined from various sources, such as an active directory of a company, a central asset database of the company, or a company intranet. The site map also optionally includes other locations 114 that may not be assigned to users. For example, cafeteria, open spaces, meeting rooms, and other locations at which multiple users may spend time may also be received in the site map. Alternatively, configuration engine 108 may receive a list of users and query a database that may list assigned locations for various users to determine the assigned locations for the selected users.

At 204, configuration engine 108 assigns a user device 112 to a user. For example, a user may be provisioned a user device by the company. At 206, configuration engine 108 may associate a device identifier with an assigned user location on the site map for the user. For example, configuration engine 108 may assign sixth location 114-6 in FIG. 1 to the device identifier. The device identifier may be defined differently. For example, the device identifier may be a medium access control (MAC) address. The device identifier may be detected in different ways. For example, configuration engine 108 may query a database that may list the device identifiers for various user devices to select the device identifier for user device 112. In other embodiments, the device identifier may be detected via a radio monitor 106 during an authentication process. Also, the device identifier may be manually entered.

Upon the association of the device identifier with the assigned user location, location tracking system 110 can then receive measurements of a signal between user device 112 and radio monitors 106. That is, the signal transmitted by user device 112 is received and measured by radio monitor 106 or vice-versa. The measurements may be received by location tracking system 110 from user device 112 and/or one or more radio monitors 106. The measurements are indicators of the strength of the signal between user device 112 and radio monitor 106. The signal strength may be indicated as RSSI. For example, the higher the RSSI value, the stronger the signal, and the lower the RSSI value, the weaker the signal. Although RSSI values are described, other measurements that measure signal strengths may also be used.

Figure 3A:
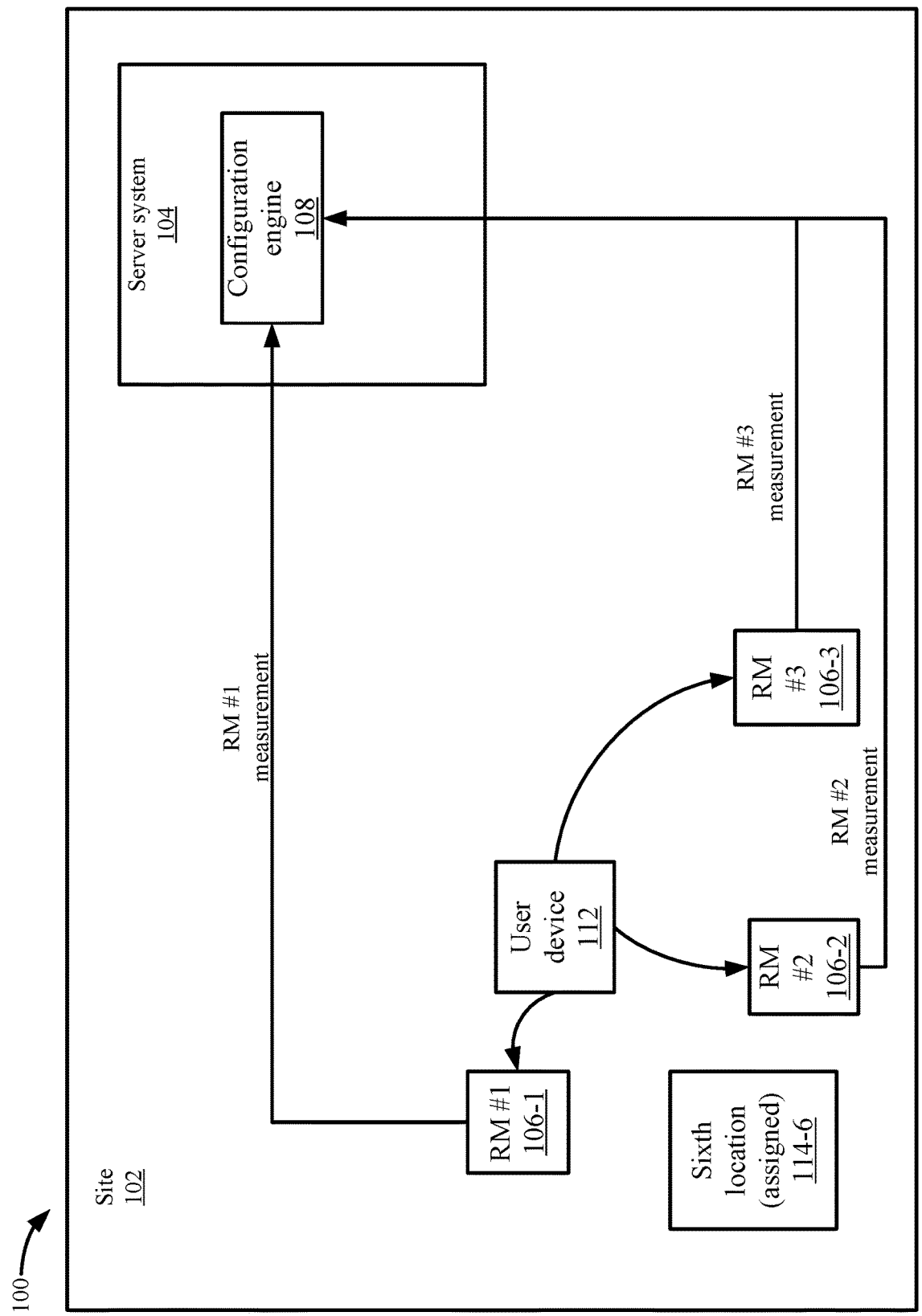
FIG. 3A depicts an example of measurements taken when a user device is in a first location according to some embodiments.
Figure 3B:
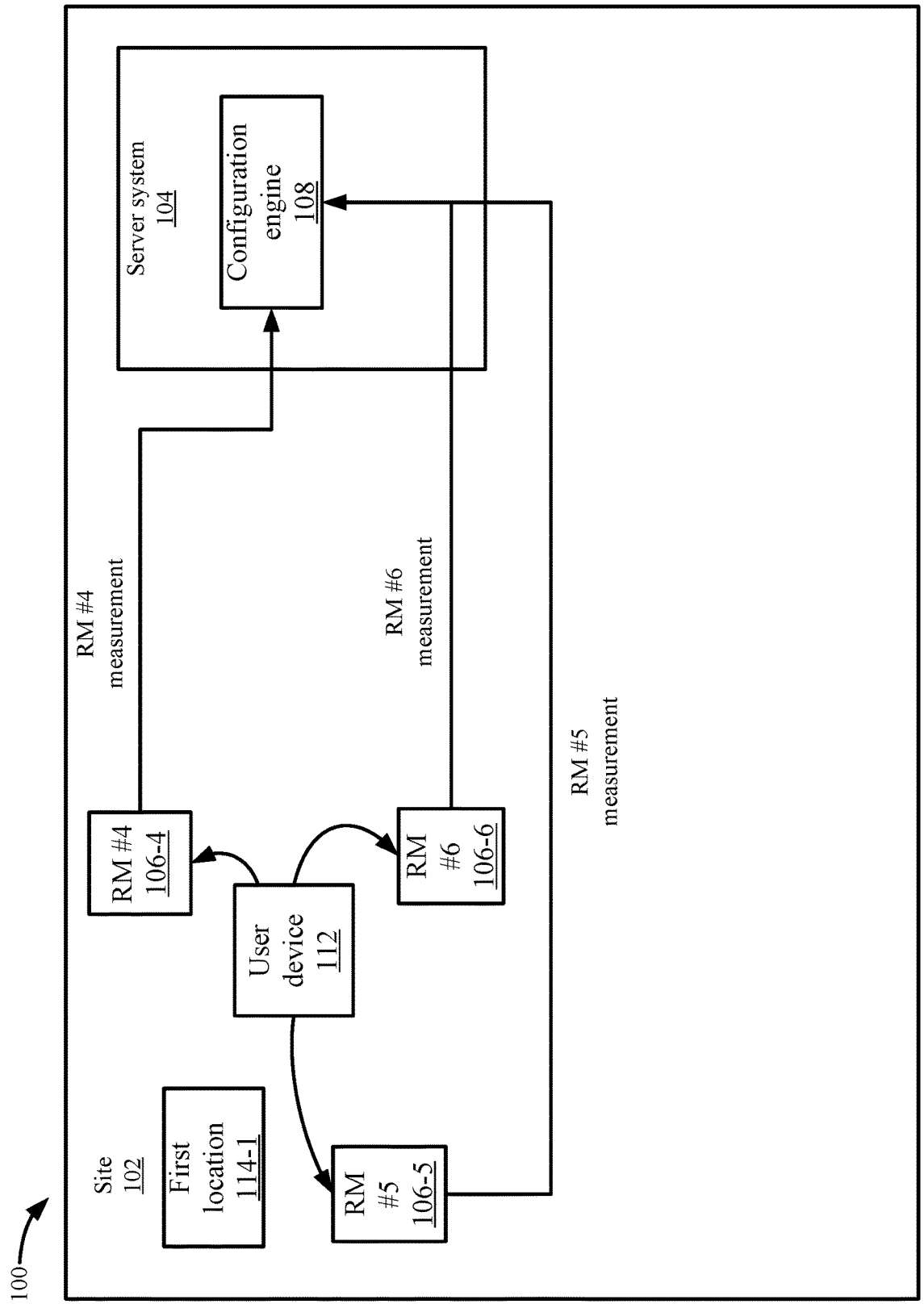
FIG. 3B depicts the user device in a second location according to some embodiments.

The signal measurements between radio monitors 106 and user device 112 vary based on the location of user device 112. Not all radio monitors 106 in site 102 may detect a signal with user device 112. That is, the signal may not reach some radio monitors 106 that are too far away from user device 112 or the signal measurement may be weaker than a threshold to be considered. FIGS. 3A and 3B depict measurements that can be made by different radio monitors 106 according to some embodiments. In some embodiments, a radio monitor 106 may take the measurement of the signal between user device 112 and radio monitor 106. Radio monitors 106 then send the measurements to configuration engine 108. However, in other embodiments, user device 112 may take the measurement of the signal between user device 112 and radio monitor 106. If user device 112 takes the measurement, then user device 112 is configured to send the measurement to configuration engine 108. The following will discuss using radio monitors 106 making measurements, but user device 112 could make the measurements. One difference is that user device 112 may have to download an application to make the measurements while radio monitors 106 are typically operated by a company and not a user and can be more easily configured.

FIG. 3A depicts an example of measurements taken when user device 112 is in a first location according to some embodiments. A user may be using user device 112 in a location that is proximate to sixth location 114-6. At sixth location 114-6, a signal between user device 112 and radio monitors 106 is measured. Then, radio monitor #1 106-1, radio monitor #2 106-2, and radio monitor #3 106-3 record measurements associated with a signal between itself and user device 112. For example, radio monitor #1 106-1 sends an RM #1 measurement to configuration engine 108; radio monitor #2 106-2 sends an RM #2 measurement to configuration engine 108; and radio monitor #3 106-3 sends an RM #3 measurement to configuration engine 108. It is noted that other radio monitors may also detect the signal and take measurements, and the number of measurements for a location may not be limited to three.

Each radio monitor measurement may be different depending on the signal strength detected at each respective radio monitor 106-1 to 106-3. For example, RM #1 measurement may be −45 decibels (db); RM #2 measurement may be −60 db; and the RM #3 measurement may be −70 db. The measurement in db may indicate the signal strength that is detected where a higher number is a stronger signal and a lower number is a weaker signal. Generally, a less negative signal (e.g., −45 db) is stronger than a more negative signal (e.g., −90 db). The measurement may depend on how close a radio monitor 106 is to user device 112, such as if user device 112 is much closer to radio monitor #1 106-1 than radio monitor #2 106-2, then the RM #1 measurement may be stronger than the RM #2 measurement. But if user device 112 is farther away from radio monitor #1 106-1 than radio monitor #2 106-2, then the RM #1 measurement may be lower than the RM #2 measurement. Other factors may also contribute to the measurement made, such as impediments may affect the signal, such as a wall in between user device 112 and radio monitor #3 106-3 may lower the RM #3 measurement, whereas a direct line of sight to radio monitor #1 106-1 may contribute to a stronger measurement for the signal.

The user may not be confined to the same location within site 102. For example, the user may move around site 102 where different radio monitors 106 are able to detect a signal from user device 112 and take measurements. FIG. 3B depicts user device 112 in a second location according to some embodiments. User device 112 has moved to a different location than that of sixth location 114-6 described in FIG. 3A. For example, user device 112 has moved to a location that is closer to first location 114-1 than sixth location 114-6. In some examples, the user may have moved to first location 114-1 for a reason, such as to go to a meeting, talk to another user, go to the cafeteria, etc. In first location 114-1, a radio monitor #4 106-4 detects a signal from user device 112 and makes an RM #4 measurement. Similarly, radio monitor #5 106-5 takes an RM #5 measurement, and radio monitor #6 106-6 takes an RM #6 measurement.

The measurements for first location 114-1 may be detected at a different time from the measurements detected at sixth location 114-6. Additionally, radio monitors 106 take measurements of signals detected from user device 112 at other times. This forms a time series of measurements for user device 112. Referring back to FIG. 2, at 210, configuration engine 108 stores a time series of measurements for user device 112. For example, at a first time, configuration engine 108 may have stored the RM #1 measurement, the RM #2 measurement, and the RM #3 measurement. Then, at the second time, configuration engine 108 may store the RM #4 measurement, the RM #5 measurement, and the RM #6 measurement. Along with the measurements, configuration engine 108 may also store a time stamp and the device identifier. The time series of measurements may be different than the site survey because the measurements may be taken over a larger span of time. In the site survey, a surveyor may take one or more measurements at a location, and then move to another location. The time series of measurements stores measurements from multiple locations and also over time, such as the user may move to different locations where measurements are taken over time.

Figure 3C:
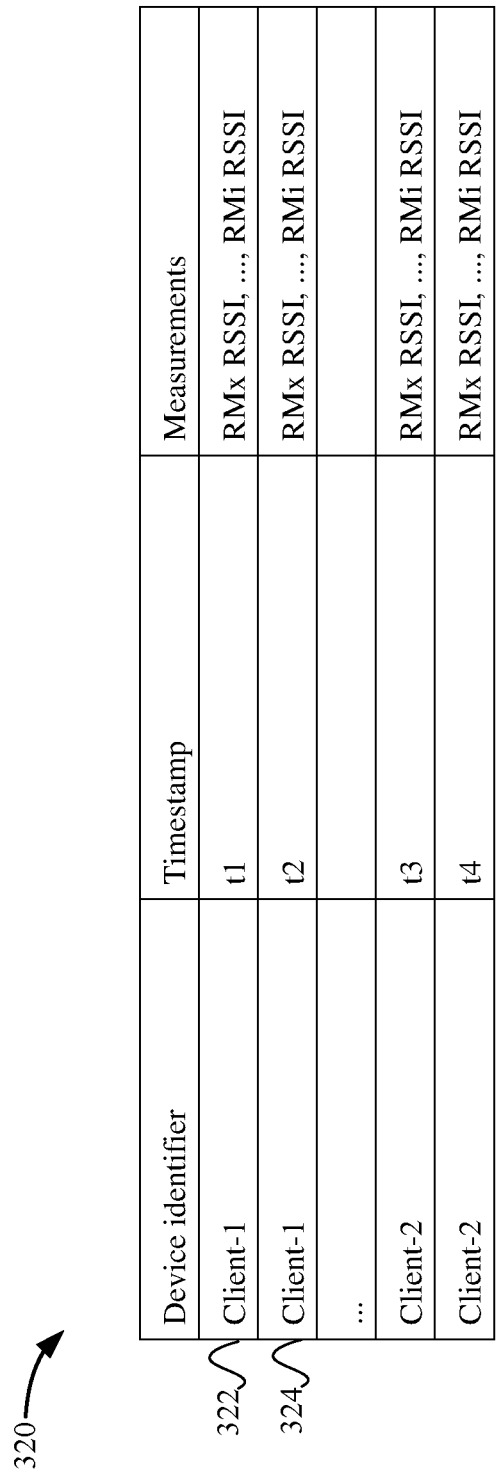
FIG. 3C depicts a table that is storing the time series of measurements according to some embodiments.

FIG. 3C depicts a table 320 that is storing the time series of measurements according to some embodiments. Although the format of table 320 is described, other formats may be appreciated. At 322, a device identifier may be "Client-1". This may be the device identifier for user device 112 discussed in FIGS. 3A and 3B. At 324, the measurement taken as discussed in FIG. 3A may be stored. A timestamp t1 may be a first time and the measurements may be RMx RSSI, . . . , RMi RSSI, which may represent RM #1 measurement, RM #2 measurement, and RM #3 measurement. The notation of RMx to RMi may be measurements from different radio monitors and may not necessarily be the same radio monitors.

At 326, the same device identifier of "Client-1" is received at a timestamp t2. The entry of 326 may be for the measurements described in FIG. 3B. For example, the measurements may be the RM #4 measurement, the RM #5 measurement, and the RM #6 measurement.

Table 320 may also include measurements that other user devices, such as a user device with an identifier of "Client-2". This client may also include entries with timestamps and measurements.

Filtering Process

As seen in FIGS. 3A and 3B, a user may move to different locations. Because the user is not performing a site survey, but rather using user device 112 as would be during the normal course of the day, such as during work, a user may move user device 112 to different locations. However, configuration engine 108 is attempting to determine measurements that will be assigned to sixth location 114-6. Having other measurements from different locations may affect the accuracy of the measurements for sixth location 114-6. Accordingly, configuration engine 108 may filter out some of the measurements that are taken due to the mobility of user device 112. After the filtering, configuration engine 108 has determined stable measurements for sixth location 114-6. Stable measurements may be measurements that are not fluctuating because of movement by user device 112.

Figure 4:
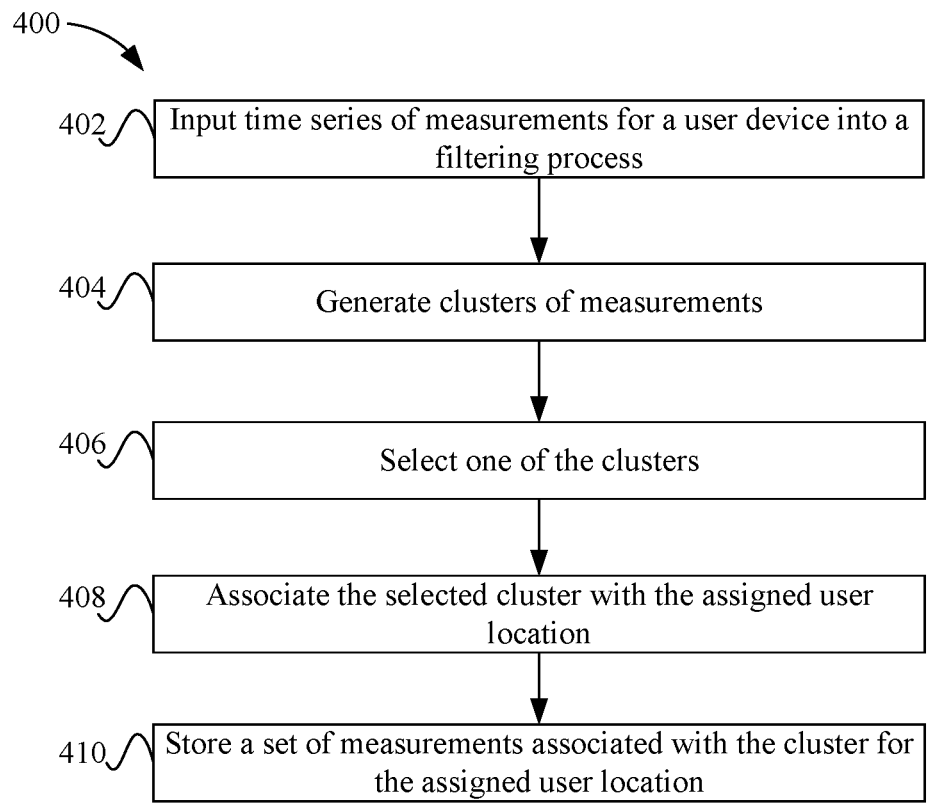
FIG. 4 depicts a simplified flowchart of a method for performing a filtering process on a time series of measurements according to some embodiments.

FIG. 4 depicts a simplified flowchart 400 of a method for performing a filtering process on a time series of measurements according to some embodiments. At 402, configuration engine 108 inputs a time series of measurements for user device 112 into a filtering process. For example, configuration engine 108 may retrieve entries in table 320 for a device identifier. In some examples, configuration engine 108 may retrieve all entries for a specific device identifier, such as Client-1, or just a subset, such as the measurements for the last week. Using more recent measurements may provide a more accurate reading in case some change in the environment has occurred, such as performance degradation or changes to radio monitors.

Figure 5:
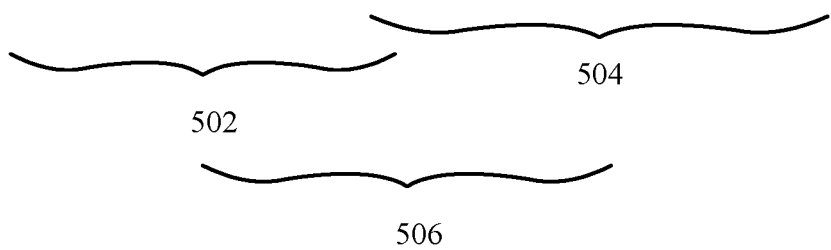
FIG. 5 depicts an example of the clustering process according to some embodiments.

At 404, configuration engine 108 generates clusters of measurements. Configuration engine 108 may use different processes to generate the clusters, such as an unsupervised learning algorithm (e.g., K-means clustering), but other clustering processes may be used. The clustering process may take a series of data points for a selected user device 112 and isolate them into multiple clusters. FIG. 5 depicts an example 500 of the clustering process according to some embodiments. Different measurements for different timestamps are shown for associated radio monitors 106-1 to 106-5. Although five radio monitors are discussed, any number of radio monitors may be used. At timestamp TS #1, radio monitor #1 106-1 recorded a measurement of −45 db, RM #2 106-2 recorded a measurement of −50 db, and RM #3 106-3 recorded a measurement of −60 db. At timestamp TS #2 and timestamp TS #3, RM #1 106-1, RM #2 106-2, and RM #3 106-3 also recorded measurements of the values −46 db, −53 db, and −63 db, and −43 db, −48 db, and −55 db, respectively. Radio monitors #4 106-4 to radio monitor #5 106-5 did not record any measurements during timestamps TS #1, TS #2, and TS #3. Also, some of radio monitors #4 106-4 to radio monitor #5 106-5 may have recorded measurements, but configuration engine 108 may only use the top X measurements (e.g., the top 3 strongest measurements).

At timestamp TS #4, a different set of radio monitors 106 recorded measurements. For example, radio monitor #3 106-3 recorded a measurement of −100 db, radio monitor #4 106-4 recorded a measurement of −50 db, and radio monitor #5 106-5 recorded a measurement of −60 db. Radio monitor #2 106-2 and radio monitor #3 106-3 did not record any measurements at timestamp #4.

At timestamp #5, radio monitor #1 106-1, radio monitor #2 106-2, and radio monitor #3 106-3 again recorded measurements of: −45 db, −50 db, and −60 db, respectively. Other measurements at timestamp TS #6, timestamp TS #7 and timestamp TS #8 are taken, as shown. The clustering process may determine different clusters, such as a cluster for measurements taken by radio monitor #1 106-1, radio monitor #2 106-2, and radio monitor #3 106-3 at 502. The clustering process may also determine another cluster for radio monitor #3 106-3, radio monitor #4 106-4, and radio monitor #5 106-5 at 504. The clustering process may also determine another cluster for radio monitor #2 106-2, radio monitor #3 106-3, and radio monitor #4 106-4 at 506.

While the illustration above determined clusters in terms of radio monitor identities, different processes and criteria may be used to determine the clusters. For example, it is also possible that the same set of radio monitors create two or more different clusters based on signal strength value differences. Techniques such as K-means clustering can use Euclidean distance between signal strength measurement vectors at different timestamps to partition time series vectors into multiple clusters.

Referring back to FIG. 4, at 406, configuration engine 108 selects one of the clusters based on a characteristic. For example, the characteristic may be a largest number of measurements. In some embodiments, the cluster with the largest number of measurements may correspond to a stable reading of measurements for the assigned location for user device 112. The selected cluster may also have to satisfy certain requirements, such as a cluster may have to have a total number of measurements that are above a threshold, such as the cluster may have to have over 25 measurements. This ensures that a number of measurements have been taken. Also, the selected cluster may have to have a difference from another cluster of X measurements or a percentage difference. That is, if two clusters are within a small amount of total measurements within each other, then configuration engine 108 may not be able to accurately tell which measurements are the stable measurements. In the example of FIG. 5, the cluster at 502 may include five measurements whereas the cluster at 504 may include two measurements and configuration engine 108 selects the cluster at 502. It is noted that over time, the number of measurements may be much higher and define a cluster much more distinctly as in one cluster may have a large amount of measurements from specific radio monitors due to a user being at the assigned location much more frequently. The selected cluster may also have to satisfy other criteria, such as the radio monitors corresponding to the cluster being known to be in the proximity of the assigned location for user device 112. The additional criteria may sometimes result into selecting a second or a third best cluster by number of measurements to be the stable reading.

At 408, configuration engine 108 associates the selected cluster with the assigned user location. For example, the cluster with the most measurements may be most likely to be where the user is working at the assigned location. Although configuration engine 108 does not know that the measurements were taken while the user was at the assigned user location, configuration engine 108 infers this because the user most likely performs his/her work at the assigned user location. In some examples, the cluster at 504 may be when the user may go to the cafeteria or a meeting room, while the cluster at 502 may be when the user is at the assigned user location.

At 410, configuration engine 108 stores a set of measurements associated with the cluster for the assigned user location. The set of measurements may be based on the measurements in the cluster. For example, configuration engine 108 may take an average of the measurements in the cluster, a median of the measurements in the cluster, or perform other calculations to determine the set of measurements. The set of measurements may also be a vector that represents the measurements from the cluster in a vector space. For example, the vector may be a representation of the measurements that were taken by radio monitors #1 106-1, radio monitor #2 106-2, and radio monitor #3 106-3.

Some locations may not be assigned specifically to a user. For example, cafeterias, meeting rooms, etc. may not have an assigned user. However, supplemental information may be used to determine a stable measurement for these unassigned user locations. In some embodiments, a calendar application that includes location information for users can be used to determine a stable measurement for the unassigned locations. For example, if a meeting reminder in the calendar system indicates that one or more users are going to be at a meeting room #1, then measurements from those user devices can be associated with meeting room #1.

Figure 6:
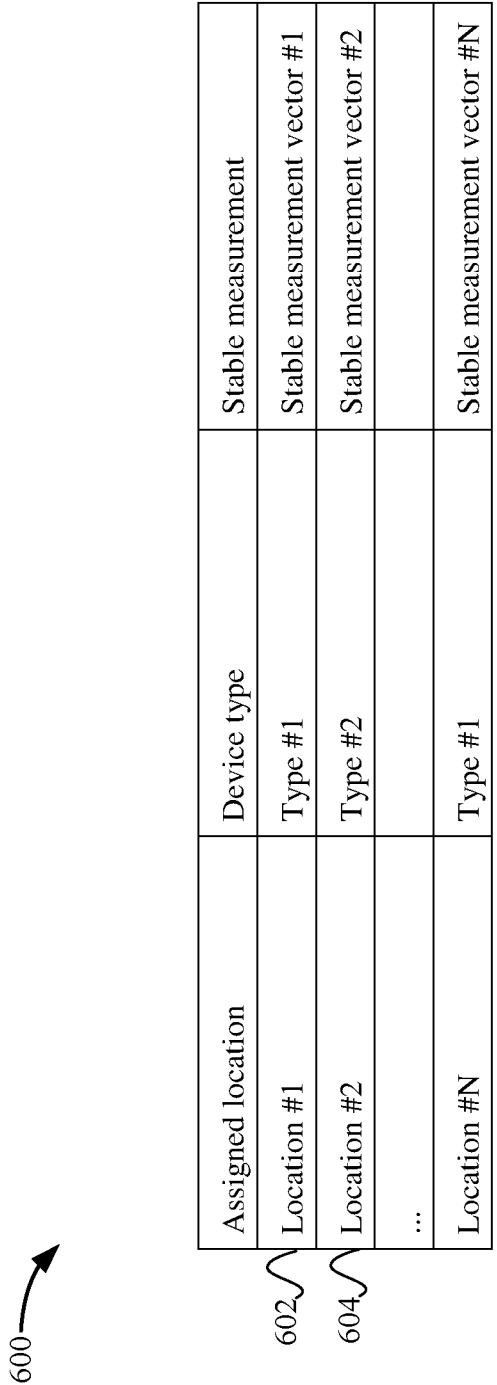
FIG. 6 depicts an example of a location tracking table that may be stored in a location tracking database according to some embodiments.

FIG. 6 depicts an example of a location tracking table 600 that may be stored in a location tracking database according to some embodiments. Location tracking table 600 may list an assigned location, a device type, and a stable measurement for each location. The assigned location may be one of the assigned locations received from the site map. The device type may be the type of device that was used to determine the stable measurement. It is noted that the device type may or may not be stored with the stable measurement. The stable measurement may be a vector that represents the measurements in the selected cluster or may be one or more measurements from a combination of radio monitors 106.

At 602, for a location #1, the device type is a type #1 and a stable measurement of a vector #1 is stored for location #1. Similarly, at 604, for a location #2, the device type is a type #2 and a stable measurement of vector #2 is stored for location #2. Other locations # N and measurements # N may be stored in location tracking table 600.

Location Tracking

Figure 7:
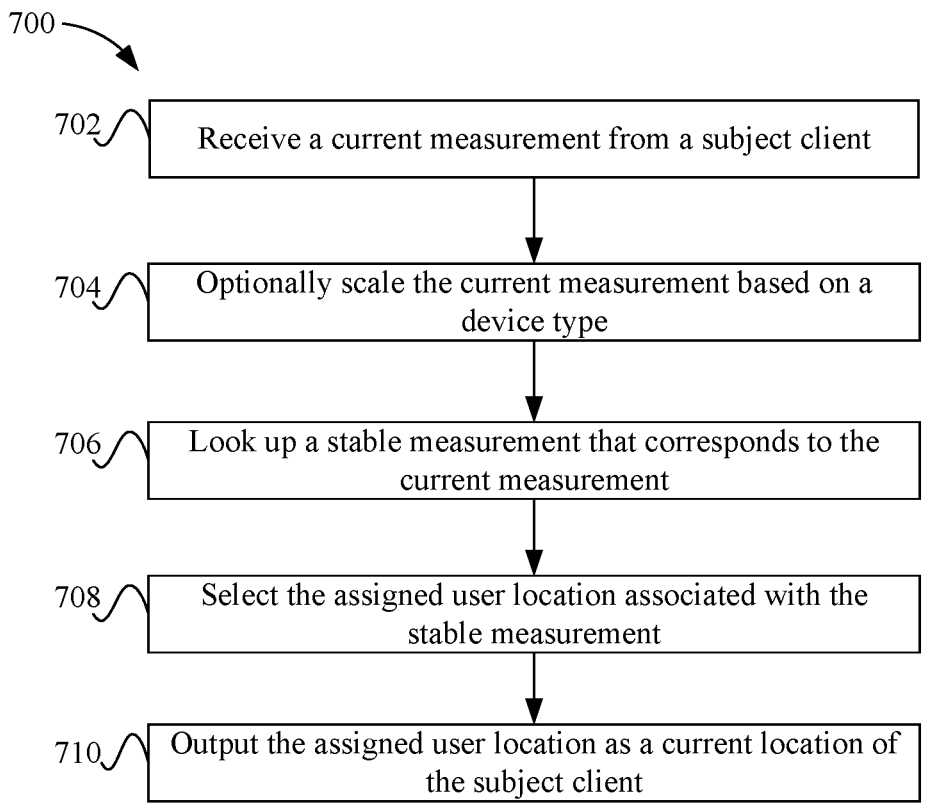
FIG. 7 depicts a simplified flowchart of a method for performing location tracking according to some embodiments.

After storing measurements for multiple locations in site 102, location tracking system 110 can perform location tracking. FIG. 7 depicts a simplified flowchart 700 of a method for performing location tracking according to some embodiments. At 702, location tracking system 110 receives a current measurement from a subject client. The subject client may be any device in which location tracking is being performed and does not necessarily have to be any of the user devices that were used to initialize the location tracking system, but could be one of the user devices. The current measurement may involve N measurements with the highest measurement values, such as RSSI values. The value of N may be any number of radio monitors 106, such as three radio monitors 106, but other numbers of radio monitors 106 may be used to select a different number of measurement values. For example, location tracking system 110 selects the top 3 measurement values (e.g., the strongest) from three radio monitors 106 as the current measurement.

At 704, location tracking system 110 may optionally scale the current measurement. Location tracking system 110 may apply a scaling factor to the current measurement before attempting to look up the measurement from the stored measurements. The scaling may be performed based on different characteristics. For example, location tracking system 110 uses a device type to scale the current measurements. Different device types may cause different measurements to be made by radio monitors 106 even though the devices are in the same location. For example, if a first device type is used to determine the measurements that are stored for an assigned user location, and a second device type is used by the subject client to determine the current measurement, the values measured by radio monitors 106 may be different due to the device type. For example, different device types may have different power characteristics that can be normalized by the scaling.

Accordingly, configuration engine 108 may scale the current measurement to normalize the current measurement with the set of measurements in the tracking table. As discussed above, a device-type identifier may be associated with a stable measurement vector in the tracking table. Location tracking system 110 may determine the device-type identifier for the subject client based on different methods, such as the fingerprinting of the data sent by the subject. The device type of the user device whose reading resulted in the stable measurement vector is also identified using a similar technique. The scaling factor may take into account differences in power emitted in signals by different device types. In some embodiments, configuration engine 108 applies the scaling factor to the current measurement to take into account the device type. Alternatively, location tracking system 110 applies the scaling factor to the stable measurements to take into account the device type.

At 706, configuration engine 108 looks up a stable measurement that corresponds to the current measurement. For example, location tracking system 110 selects a stable measurement that includes values from the same radio monitors as the current measurement and is closest to the current measurement. In some embodiments, when using a vector space, location tracking system 110 selects a stable measurement vector that is closest to the current measurement vector. The vector space allows location tracking system 110 to perform the comparison using a distance from the current measurement vector to stable measurement vectors to select one of the stable measurement vectors.

At 708, location tracking system 110 selects the assigned user location associated with the stable measurement from the tracking table. Then, at 710, location tracking system 110 outputs the assigned user location as a current location of the subject client. For example, the assigned location may be output to a subject client location tracking database that is used to track the location of the subject client. Other embodiments may output the current location to the subject client.

Figure 8:
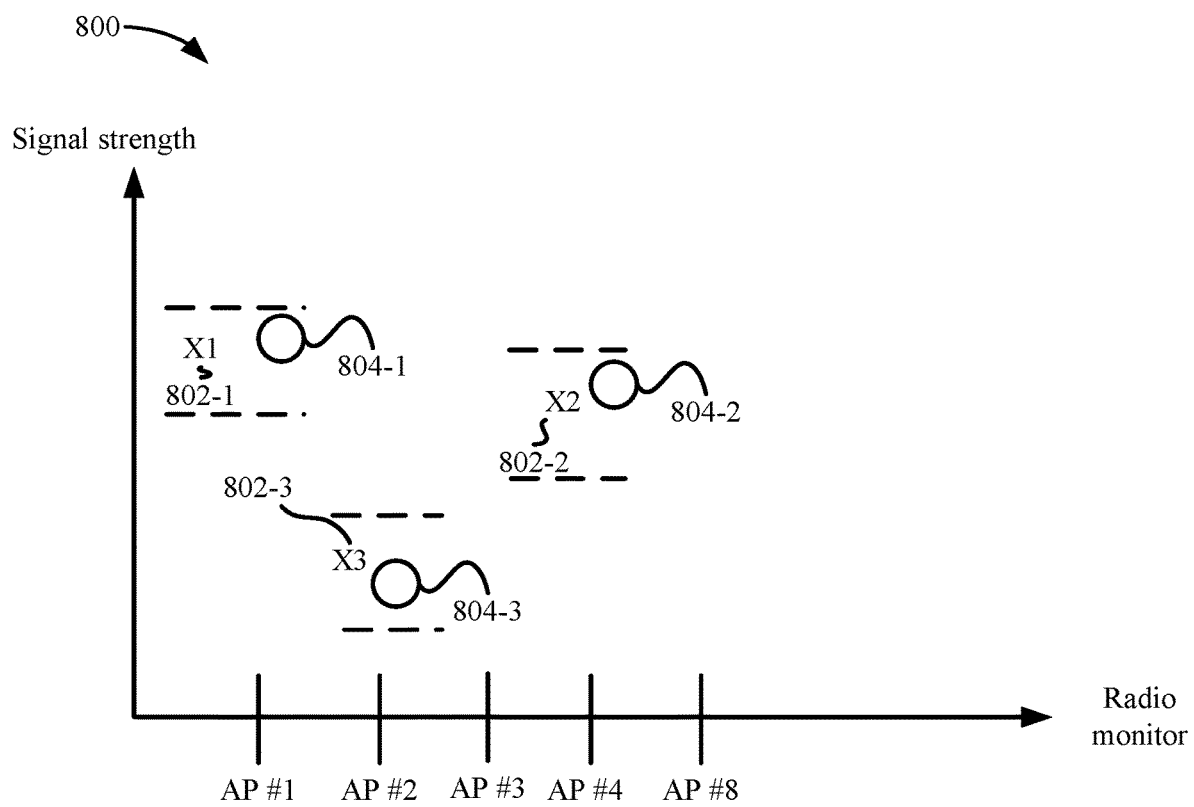
FIG. 8 depicts an example of determining the current location of the subject client according to some embodiments.

FIG. 8 depicts an example of determining the current location of the subject client according to some embodiments. Graph 800 depicts a stable reading 802 for one assigned location wherein the Y axis represents the value of the signal strength and the X axis represents the radio monitors. A measurement X1 at 802-1 may represent a component of the stable reading at radio monitor AP #1; a measurement X2 at 802-2 may represent a second component of the stable reading at radio monitor AP #2; and measurement X3 at 802-3 may represent a third component of the stable reading at radio monitor AP #3. A measurement at 804, along with its components 804-1, 804-2 and 804-3 may represent a current measurement vector.

Location tracking system 110 may use a margin around each stable measurement vector to associate the current measurement with the stable measurement. For example, dotted lines around each stable measurement represent the margin that location tracking system 110 applies to each stable measurement. If a current measurement falls within the margin, then location tracking system 110 determines that that stable measurement corresponds to the current measurement. The current measurement at 804 falls within the margin of stable measurement X3 at 802-3. Accordingly, location tracking system 110 determines that the assigned location for stable measurement X3 is associated with the current measurement.

Refinement Process

Figure 9:
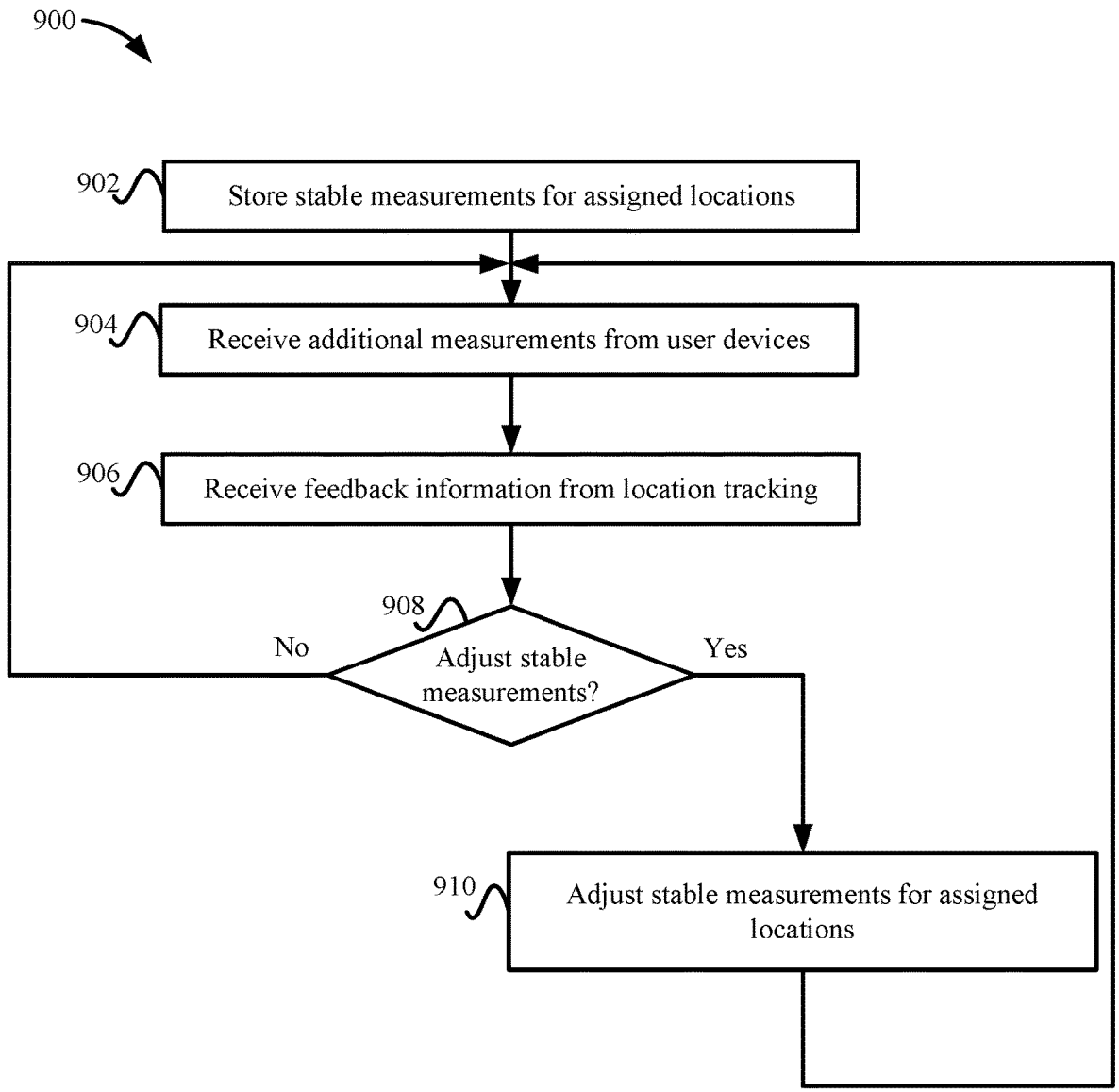
FIG. 9 depicts a simplified flowchart of a method for adjusting the stable measurements according to some embodiments.

The stable measurements may be refined in location tracking table 600 in FIG. 6 over time. This is because users may continue to use user device 112 at different locations in site 102 as opposed to a site survey being performed once. Configuration engine 108 may then refine the values of the stable measurements in some embodiments. FIG. 9 depicts a simplified flowchart 900 of a method for adjusting the stable measurements according to some embodiments. At 902, configuration engine 108 stores stable measurements for the assigned location as discussed above. At 904, configuration engine 108 receives additional measurements from user devices 112. For example, multiple user devices 112 may continue to be used by users at different locations. Configuration engine 108 may receive additional measurements from radio monitors 106. At 906, configuration engine 108 may also receive feedback information from location tracking. The feedback information may be based on different checks that may be performed during the actual location tracking of a subject client. For example, when a stable measurement for a subject client is determined, a triangulation computation is performed to perform the location tracking using a different method to determine if the triangulated location is similar to the assigned location associated with the stable measurement. Alternatively, a message may be sent to a user showing their estimated location and asking the user to provide feedback to the location's accuracy.

At 908, configuration engine 108 may determine whether to adjust the stable measurements for assigned locations. If not, the process reiterates to 904 to continue the adjustment process over time. If adjustments are to be made, at 910, location tracking system 110 adjusts one or more stable measurements for assigned locations according to the adjustments determined based on the additional measurements and feedback information.

CONCLUSION

Accordingly, some embodiments initialize a tracking database with stable measurements by leveraging the site location that assigns locations to users. This assumes that an assigned location for a user may be the location in which the user spends the most amount of time. A clustering process can be used to determine a stable measurement for the assigned location. Using the inference that the user spends most of his/her time at the assigned location allows the initialization of the tracking database with stable measurement without performing a site survey. Further, some embodiments allow the adjustment of stable measurements over time because the site survey does not need to be used and the stable measurements are determined passively as a user using user device 112 moves around site 102.

System

Figure 10:
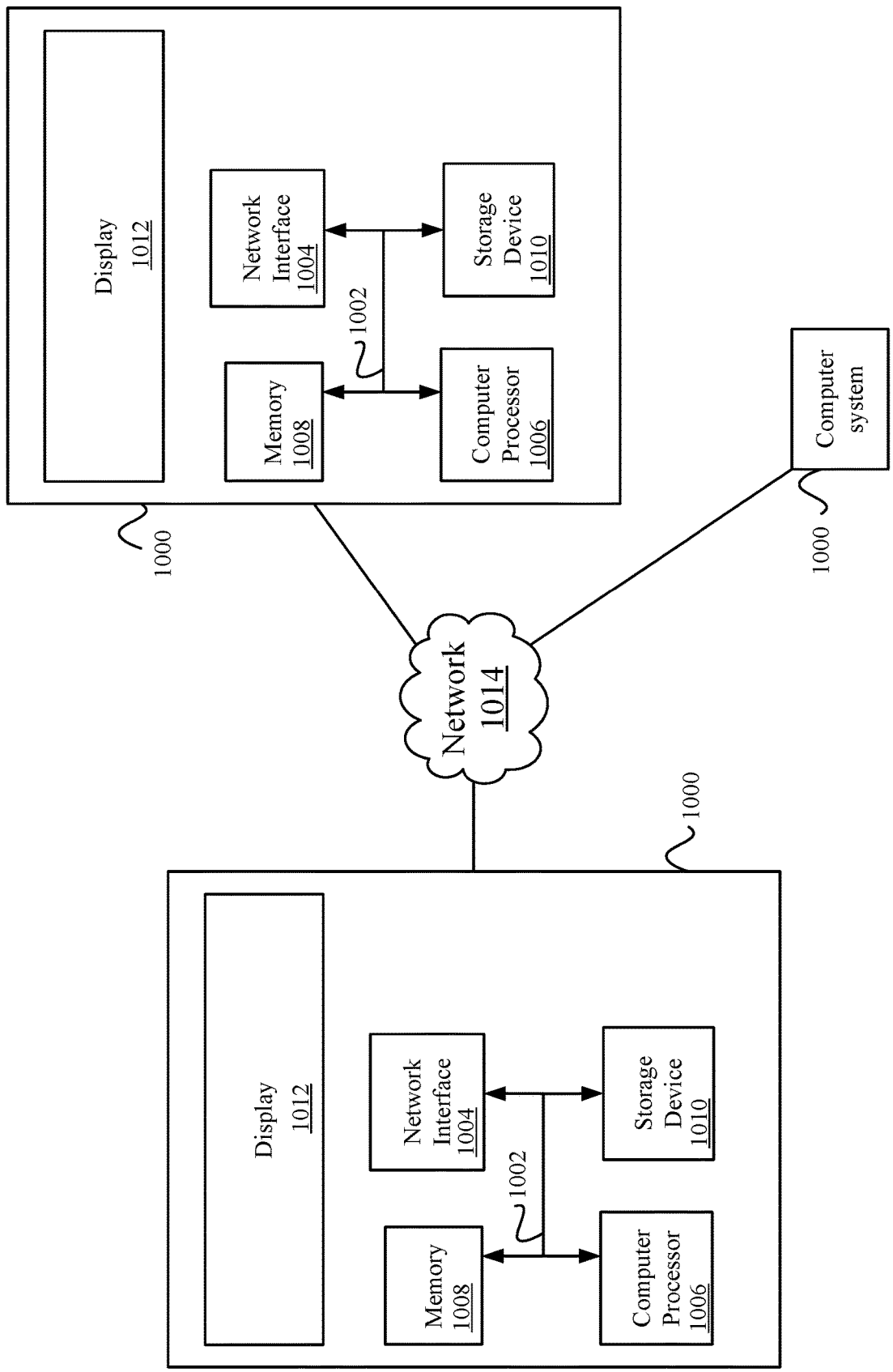
FIG. 10 illustrates an example of special purpose computer systems configured with the location tracking system according to one embodiment.

FIG. 10 illustrates an example of special purpose computer systems 1000 configured with location tracking system 110 according to some embodiments. Computer system 1000 includes a bus 1002, network interface 1004, a computer processor 1006, a memory 1008, a storage device 1010, and a display 1012.

Bus 1002 may be a communication mechanism for communicating information. Computer processor 1006 may execute computer programs stored in memory 1008 or storage device 1008. Any suitable programming language can be used to implement the routines of some embodiments including C, C++, Java, assembly language, etc. Different programming techniques can be employed such as procedural or object oriented. The routines can execute on a single computer system 1000 or multiple computer systems 1000. Further, multiple computer processors 1006 may be used.

Memory 1008 may store instructions, such as source code or binary code, for performing the techniques described above. Memory 1008 may also be used for storing variables or other intermediate information during execution of instructions to be executed by processor 1006. Examples of memory 1008 include random access memory (RAM), read only memory (ROM), or both.

Storage device 1010 may also store instructions, such as source code or binary code, for performing the techniques described above. Storage device 1010 may additionally store data used and manipulated by computer processor 1006. For example, storage device 1010 may be a database that is accessed by computer system 1000. Other examples of storage device 1010 include random access memory (RAM), read only memory (ROM), a hard drive, a magnetic disk, an optical disk, a CD-ROM, a DVD, a flash memory, a USB memory card, or any other medium from which a computer can read.

Memory 1008 or storage device 1010 may be an example of a non-transitory computer-readable storage medium for use by or in connection with computer system 1000. The non-transitory computer-readable storage medium contains instructions for controlling a computer system 1000 to be configured to perform functions described by some embodiments. The instructions, when executed by one or more computer processors 1006, may be configured to perform that which is described in some embodiments.

Computer system 1000 includes a display 1012 for displaying information to a computer user. Display 1012 may display a user interface used by a user to interact with computer system 1000.

Computer system 1000 also includes a network interface 1004 to provide data communication connection over a network, such as a local area network (LAN) or wide area network (WAN). Wireless networks may also be used. In any such implementation, network interface 1004 sends and receives electrical, electromagnetic, or optical signals that carry digital data streams representing various types of information.

Computer system 1000 can send and receive information through network interface 1004 across a network 1014, which may be an Intranet or the Internet. Computer system 1000 may interact with other computer systems 1000 through network 1014. In some examples, client-server communications occur through network 1014. Also, implementations of some embodiments may be distributed across computer systems 1000 through network 1014.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
 assigning, by a computing device, an assigned user location to a device identifier of a device of a user;

receiving, by the computing device, a time series of measurements of a signal associated with the device identifier, wherein each measurement is between the device and a set of spatially disposed radio monitors, wherein receiving the time series of measurements comprises:
  receiving a first measurement with a first set of spatially disposed radio monitors for the device identifier at a first time; and
  receiving a second measurement with a second set of spatially disposed radio monitors for the device identifier at a second time;
filtering, by the computing device, one or more measurements from the time series of measurements based on a characteristic to generate a set of measurements, wherein filtering one or more measurements from the time series of measurements comprises:
  removing one of the first measurement and the second measurement; and
associating, by the computing device, the set of measurements with the assigned user location, wherein different sets of measurements are associated with different assigned user locations for use in location tracking of a subject client.

2. The method of claim 1, wherein assigning the assigned user location comprises:
  receiving location information for a site that identifies assigned user locations for users; and
  receiving device information that identifies device identifiers of devices of the users.

3. The method of claim 2, wherein the assigned user location is a work area in the site assigned to the user in the location information.

4. The method of claim 1, wherein filtering one or more measurements from the time series of measurements comprises:
  removing the one or more measurements from the time series of measurements that do not meet the characteristic or selecting the one or more measurements from the time series of measurements that meet the characteristic.

5. The method of claim 1, wherein filtering one or more measurements from the time series of measurements comprises:
  selecting the one or more measurements from the time series of measurements that are within a cluster that is created using the characteristic.

6. The method of claim 1, wherein the characteristic associates a first set of measurements from the time series of measurements that are within a first cluster to the assigned user location and removes a second set of measurements from the time series of measurements that are outside of the first cluster from being associated with the assigned user location.

7. The method of claim 1, wherein the different sets of measurements for different assigned user locations in a site are determined using other user devices associated with other users assigned to the different assigned user locations.

8. The method of claim 1, further comprising:
  when performing location tracking, receiving a current measurement between the subject client and a set of radio monitors;
  selecting one of the sets of measurements that is within a margin to the current measurement between the subject client and the set of radio monitors; and
  outputting the assigned user location associated the selected one of the sets of measurements as a current location for the subject client.

9. The method of claim 8, wherein selecting one of the set of measurements comprises:
  using margins around the sets of measurements to select the one of the set of measurements in which the current measurement falls within a margin of the one of the set of measurements.

10. The method of claim 1, further comprising:
  determining a type of the device of the user; and
  storing an indication of the type of the device with the set of measurements, wherein the indication is used to normalize a current measurement received for the subject client when performing location tracking for the subject client with respect to the set of measurements for the device.

11. The method of claim 10, further comprising:
  determining a type of the subject client when performing location tracking for the subject client; and
  use an indication of the type of the subject client to normalize the current measurement received from the subject client with respect to the set of measurements for the device.

12. The method of claim 1, further comprising:
  refining the set of measurements based on additional measurements of the signal associated with the device identifier.

13. A non-transitory computer-readable storage medium having stored thereon computer executable instructions, which when executed by a computing device, cause the computing device to be operable for:
  assigning an assigned user location to a device identifier of a device of a user;
  receiving a time series of measurements of a signal associated with the device identifier, wherein each measurement is between the device and a set of spatially disposed radio monitors, wherein receiving the time series of measurements comprises:
    receiving a first measurement with a first set of spatially disposed radio monitors for the device identifier at a first time; and
    receiving a second measurement with a second set of spatially disposed radio monitors for the device identifier at a second time;
  filtering one or more measurements from the time series of measurements based on a characteristic to generate a set of measurements, wherein filtering one or more measurements from the time series of measurements comprises:
    removing one of the first measurement and the second measurement; and
  associating the set of measurements with the assigned user location, wherein different sets of measurements are associated with different assigned user locations for use in location tracking of a subject client.

14. The non-transitory computer-readable storage medium of claim 13, wherein assigning the assigned user location comprises:
  receiving location information for a site that identifies assigned user locations for users; and
  receiving device information that identifies device identifiers of devices of the users.

15. The non-transitory computer-readable storage medium of claim 13, wherein filtering one or more measurements from the time series of measurements comprises:

selecting the one or more measurements from the time series of measurements that are within a cluster that is created using the characteristic.

16. The non-transitory computer-readable storage medium of claim 13, further comprising:
   when performing location tracking, receiving a current measurement between the subject client and a set of radio monitors;
   selecting one of the sets of measurements that is within a margin to the current measurement between the subject client and the set of radio monitors; and
   outputting the assigned user location associated the selected one of the sets of measurements as a current location for the subject client.

17. A method comprising:
   storing, by a computing device, a set of first measurements for each of a plurality of assigned user locations as a reference for each respective assigned user location, wherein one of the set of first measurements is determined by a device and includes a first measurement with a first set of spatially disposed radio monitors at a first time and a second measurement with a second set of spatially disposed radio monitors at a second time, and wherein one of the first measurement and the second measurement is removed from the one of set of first measurements, the device being used by a user that is assigned to a respective assigned user location;
   receiving, by the computing device, a set of second measurements between a subject client and a set of radio monitors;
   selecting, by the computing device, a stored set of measurements that correspond to the set of second measurements from the subject client, wherein the stored set of first measurements are associated with an assigned user location; and
   outputting, by the computing device, the assigned user location.

18. The method of claim 17, wherein selecting the stored set of measurements that correspond to the set of second measurements comprises:
   selecting one of the stored set of first measurements for each of the plurality of assigned user locations that is within a margin to the set of second measurements between the subject client and the set of radio monitors.

19. The method of claim 17, further comprising:
   determining a type of the subject client; and
   use an indication of the type of the subject client to normalize the set of second measurements received from the subject client with respect to the stored set of first measurements for each of the plurality of assigned user locations.

20. The method of claim 17, further comprising:
   verifying the assigned user location using a different method that does not use the set of second measurements.

* * * * *